United States Patent [19]

Barrett et al.

[11] Patent Number: 4,856,180

[45] Date of Patent: Aug. 15, 1989

[54] METHOD OF TERMINATING WINDING LEADS

[75] Inventors: Eugene R. Barrett, Columbia City; Richard L. Arnett, Ft. Wayne, both of Ind.

[73] Assignee: General Electric Company, Fort Wayne, Ind.

[21] Appl. No.: 280,349

[22] Filed: Dec. 6, 1988

[51] Int. Cl.[4] .......................................... H02K 15/00
[52] U.S. Cl. .................................. 29/596; 29/33 M; 29/564.8; 83/16; 83/171; 81/9.51
[58] Field of Search ............... 29/596, 33 M, 33 T, 29/33, 52, 564.8; 81/9.51; 83/16, 171; 310/71

[56] References Cited

U.S. PATENT DOCUMENTS

| 2,801,354 | 7/1957 | Donahoo | 310/71 |
| 3,364,801 | 1/1968 | Johnston | 81/9.51 |
| 3,521,508 | 7/1970 | Masato Kamimura et al. | 81/9.51 |
| 3,725,707 | 4/1973 | Leimbach et al. | 29/596 |
| 4,196,510 | 4/1980 | Gudmestad et al. | 29/33 M |
| 4,283,645 | 8/1981 | Hofmann | 310/71 |

Primary Examiner—P. W. Echols
Attorney, Agent, or Firm—Ralph E. Krisher, Jr.

[57] ABSTRACT

A method of terminating a set of leads integral with a winding on a dynamoelectric machine stator assembly with the winding and the leads formed of magnet wire having a conductor with a dielectric material coating adhered in insulating relation thereto, and a set of dielectric tubes extend about the leads, respectively. To practice this method, the tubes are arranged in preselected positions with the free ends of the leads extending beyond one opposite end portion of the tubes, respectively. Each tube is melted through to sever a distal section from each tube adjacent its one opposite end portion while the insulating integrity of the dielectric material coating on the leads is maintained.

16 Claims, 8 Drawing Sheets

FIG_3

FIG_4

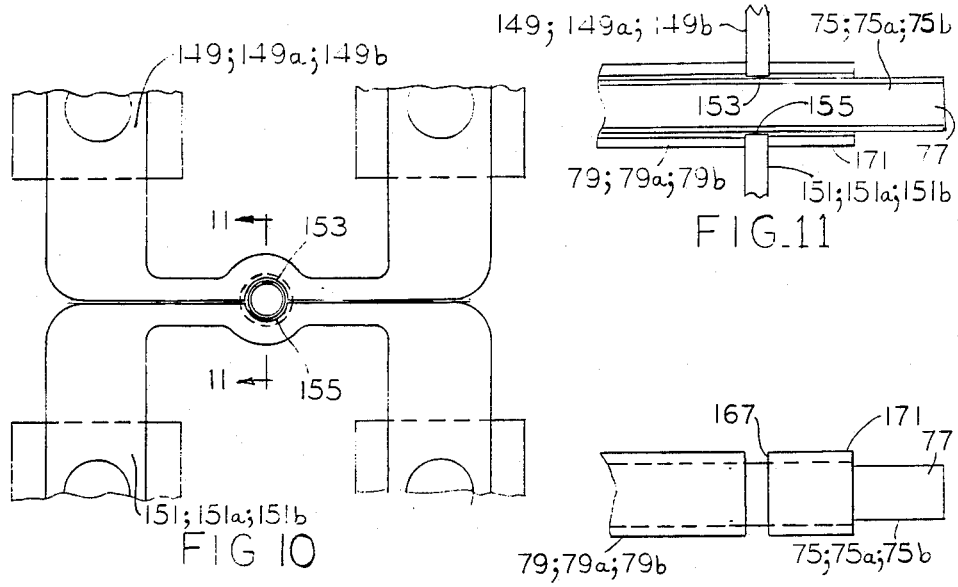
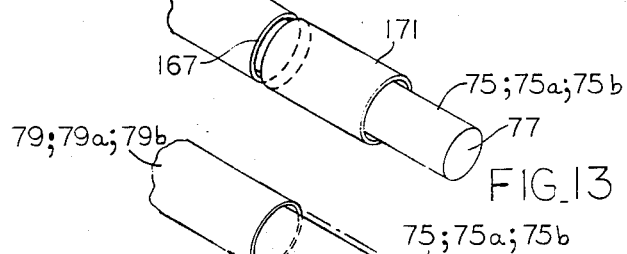
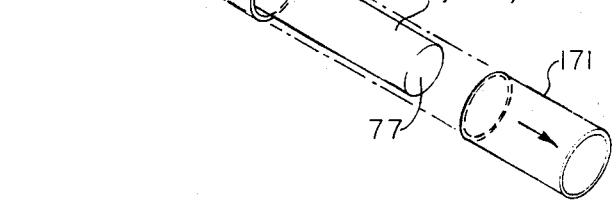
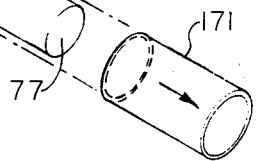
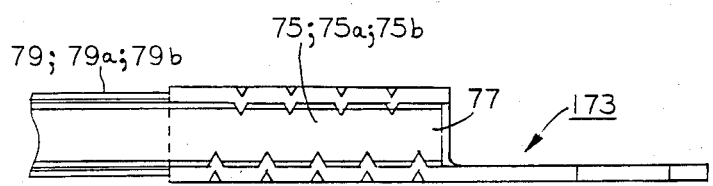

METHOD OF TERMINATING WINDING LEADS

FIELD OF THE INVENTION

This invention relates in general to the fabrication of electrical apparatus and in particular to a method of terminating integral leads of a winding on a dynamoelectric machine stator assembly.

BACKGROUND OF THE INVENTION

In the past, various different apparatus and methods were utilized in the fabrication of dynamoelectric machines, such as for instance hermetic electric motors or the like, in order to effect the termination of a set of leads integral with the windings on a stator assembly for such electric motors. In the fabrication of some past hermetic electric motors, the windings and the leads thereof were formed of magnet wire having a conductor with a dielectric material coating adhered in insulating relation about the conductor. For convenience, the winding leads were brought out from the winding generally at a preselected area on a part of the winding, such as for instance one of the opposite generally annular groupings of winding end turns extending beyond one of the opposite end faces of the stator assembly. The winding leads were passed through dielectric material tubes so that the free ends of such leads extended beyond the free end portion of such tubes, and an anchored end portion of such tubes was disposed between the aforementioned one end turn groupings of the windings. Therefore, during a press-back operation to form and size the end turn groupings of the windings, the anchored ends of the tubes were secured in displacement preventing engagement between the end turns of one of the pressed-back end turn groupings.

Various different past apparatus have been employed to remove a distal section of the tubes and to strip the dielectric material coating from the free ends of the leads to prepare them for termination with either individual terminals or a terminal block of well known construction. For instance, laser systems were employed in the past to remove the aforementioned distal sections from the tubes and strip the dielectric material coating from the free ends of the leads. However, one of the disadvantages or undesirable features associated with the aforementioned past use of laser systems is believed to be that dielectric material residue from the distal sections removed from the tubes was left on the stripped conductor at free ends of the leads, and such residue is believed to have resulted in an unsatisfactory connection when terminals were gripped into engagement with the stripped lead conductors. Furthermore, another disadvantageous or undesirable feature associated with the aforementioned past use of laser systems is believed to be that such laser systems were not only expensive to purchase and install but also were expensive to maintain in operation on a production line.

It is believed that various different types of currently available terminals may be satisfactorily connected in conductive relation with winding leads without stripping the dielectric material coating therefrom. When connected to the aforementioned unstripped winding leads, parts of the terminals puncture the dielectric material coating on the winding leads and conductively engage the conductor within the winding leads. Furthermore, apparatus or devices are also currently available for severing the distal end sections of the tubes; however, one of the disadvantageous or undesirable features of at least some such tube severing devices is believed to be that they also leave a residue on the dielectric material coating of the winding leads so as to be unsuitable for production usage.

SUMMARY OF THE INVENTION

Among the several objects of the present invention may be noted the provision of an improved method of terminating a set of leads integral with a winding formed of magnet wire on a dynamoelectric machine stator assembly which overcomes the above discussed disadvantageous or undesirable features, as well as others, of the prior art; the provision of such improved method in which distal sections of dielectric material tubes extending about the leads may be severed from such tubes without leaving a dielectric material residue on the dielectric material coating of the leads; the provision of such improved method in which each tube is melted or burned through to establish the severance of a distal section from each tube; the provision of such improved method in which the insulating integrity of the dielectric coating on the leads is maintained, i.e. not interrupted or melted, during the severance of the distal sections of the tubes; the provision of such improved method wherein the leads are trimmed to a preselected length prior to the severance of the distal sections of the tubes with such severance serving to trim the tubes to a preselected length predeterminately less than that of the trimmed leads; and the provision of such improved method wherein the components utilized to practice such method are of simple construction, easily assembled and economically manufactured. These as well as other objects and advantageous features of the present invention will be in part apparent and in part pointed out hereinafter.

In general, a method is provided in one form of the invention for terminating a set of leads integral with a winding on a dynamoelectric machine stator assembly. The windings and leads are formed of a conductor having a dielectric material coating adhered in insulating relation thereon, and each lead has a free end. A set of dielectric material tubes respectively extend about the leads, and each tube has a pair of generally opposite end portions. In the practice of this method, the tubes are arranged in preselected positions with the free ends of the leads extending beyond one of the opposite end portions of the tubes, respectively. Each tube is melted through to sever a distal section from each tube adjacent its one opposite end portion without transferring dielectric material residue from the tubes to the leads, and the insulating integrity of the dielectric material coating on the leads is maintained during the melting of the tubes, respectively.

Also in general, a method is provided in one form of the invention for terminating a set of leads integral with a winding on a stator assembly adapted for use in a dynamoelectric machine, the windings and the leads being formed of magnet wire having a conductor with a dielectric material coating disposed in insulating relation thereon, and each lead extends from a part of the winding and has a free end. A set of dielectric material tubes respectively arranged about the leads includes a pair of generally opposite end portions. One of the opposite end portions are disposed at least adjacent the winding part, and the other of the opposite ends are spaced adjacent the free ends of the leads, respectively. In the practice of this method, the tubes are arranged at least in part in preselected positions with respect to each other with the leads extending through the tubes, respectively. Only the leads are trimmed adjacent the free ends thereof while maintaining the tubes in their preselected positions thereby to provide each lead with a preselected length between its trimmed free end and the winding part. A distal section of each tube adjacent its other opposite end portion is severed by melting through each tube thereby to provide each tube with a preselected length between its severed end and the winding part with the preselected lengths of the tubes being predeterminately less than the preselected lengths of the leads, and the insulating integrity of the respective dielectric material coatings on the leads is maintained during the severance of the distal sections of the tubes.

BRIEF DESCRIPTION OF THE DRAWINGS

FIG. 10 is an enlarged partial elevational view taken from FIG. 7 showing the upper and lower heated blades in the protracted positions thereof to effect the severance of a distal section of one of the tubes;

FIG. 11 a sectional view taken along lines 11—11 in FIG. 10, respectively;

FIG. 12 is an enlarged side elevational view of the tube on one of the leads and illustrating the severance of the distal section of the tube;

FIG. 13 is a partial perspective view of the lead and tube shown in FIG. 12;

FIG. 14 is a partial perspective view illustrating the removal of the distal section of the tube therefrom; and FIG. 15 is a partial sectional view showing a terminal associated in terminating engagement with one of the leads of the stator assembly.

Corresponding reference characters refer to corresponding parts throughout the several views of the drawings.

The exemplifications set out herein illustrate the preferred embodiment of the invention in one form thereof, and such exemplifications are not to be construed as limiting the scope of the invention in any manner.

DETAILED DESCRIPTION OF THE PREFERRED EMBODIMENT

Figure 1:
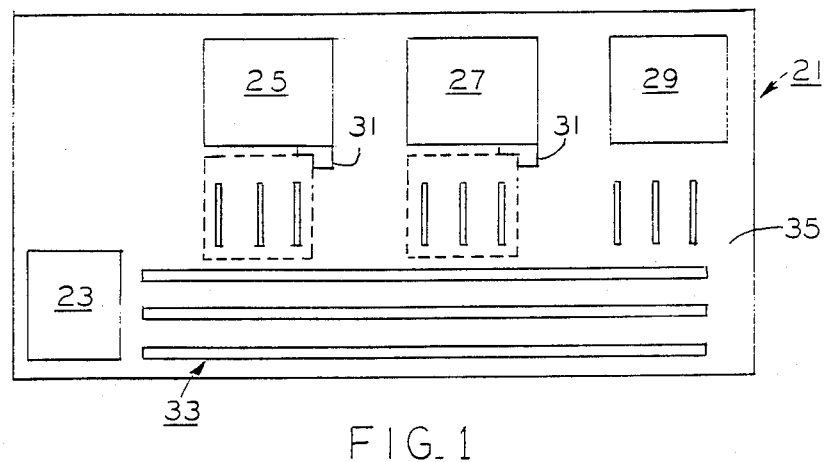
FIG. 1 is a schematic diagram of a plurality of work stations and conveyor means associated therewith which may be employed in the practice of a method of terminating a set of leads integral with a winding on a dynamoelectric machine stator assembly in one form of the invention.

With reference to FIG. 1, there is illustrated diagrammatically an apparatus 21 which may be employed in the practice of a lead terminating method in one form of the invention, as discussed hereinafter. Apparatus 21 includes at least a loading work station 23, a lead cutting or trimming work station 25, a tube severing work station 27, and a lead terminating work station 29. Further, a pallet locating device 31 is associated in a predetermined located position with at least the lead cutting and tube severing work stations 25, 27, and a slide conveyor as conveyor means, such as for instance a plurality of slide strips 33 or the like, is provided in association with work stations 23, 25, 27, 29. While the above discussed apparatus 21 is illustrated herein as being disposed on a cabinet top 35, it is contemplated that work stations 23, 25, 27, 29 may be spaced apart along a production line with other suitable conveyor means and/or transfer means associated with the work stations within the scope of the invention so as to meet at least some of the objects thereof. Furthermore, while loading and terminating work stations 23, 29 are illustrated as being disposed adjacent lead cutting and tube severing work stations 25, 27 on cabinet top 35, it is contemplated that the loading and terminating stations may be remote from the cabinet top within the scope of the invention so as to meet at least some of the objects thereof.

Figure 2:
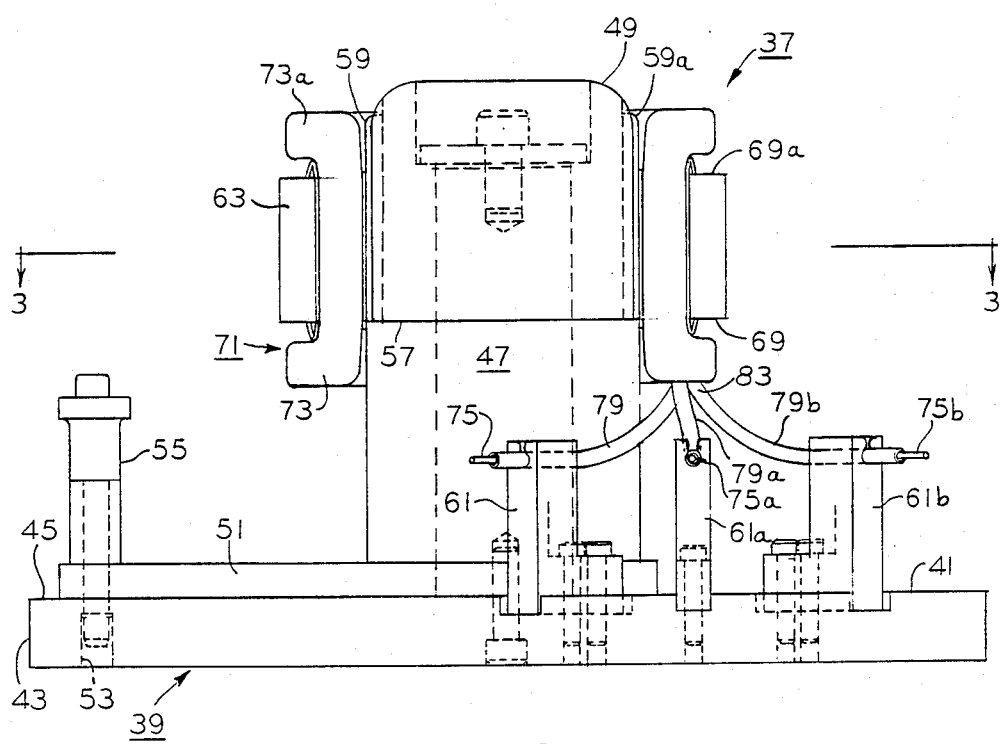
FIG. 2 is a front elevational view of a pallet device showing the stator assembly in cross-section mounted thereon with each lead extending through a dielectric material tube and disposed in a preselected position on the pallet device.
Figure 3:
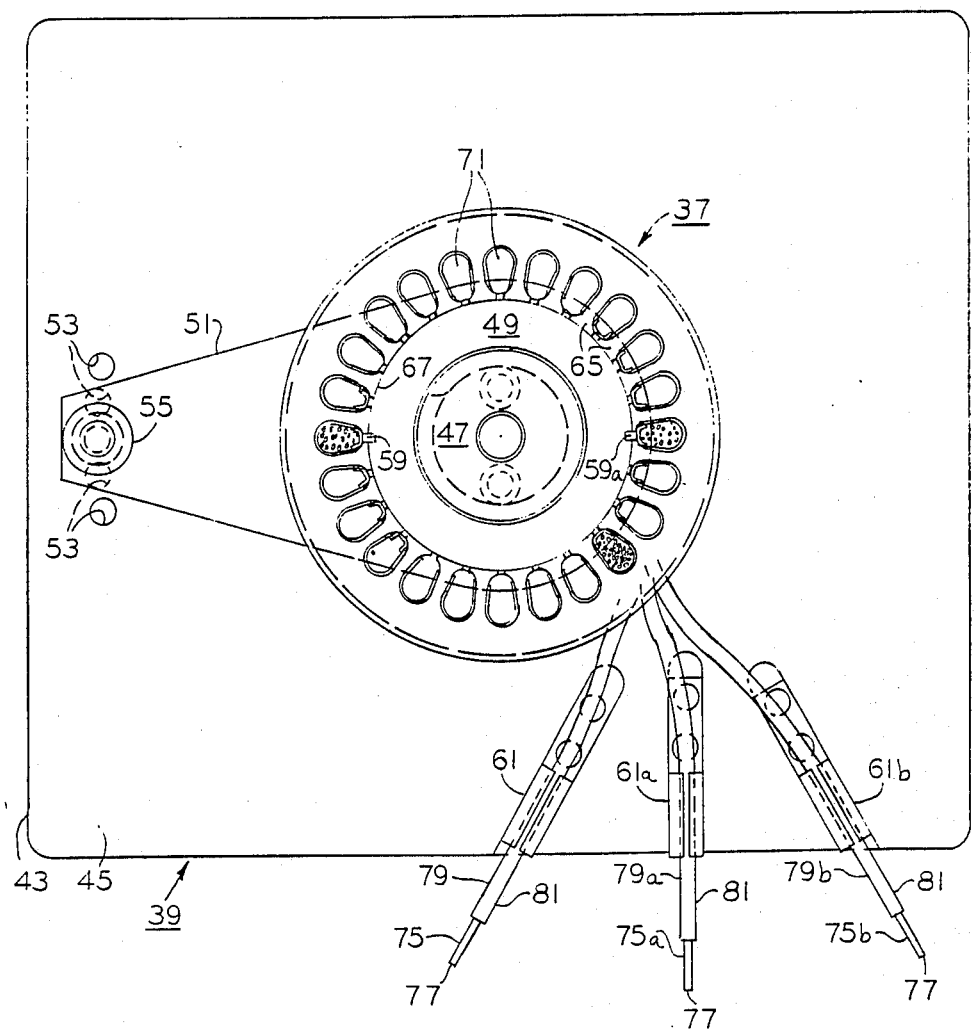
FIG. 3 is a sectional view taken along line 3—3 in FIG. 2.

At loading work station 23, an operator may manually load a stator assembly 37 adapted for use in a dynamoelectric machine (not shown) onto a pallet device or pallet means 39, as best seen in FIGS. 2 and 3, and such pallet may be manually moved or transferred by the operator on conveyor means 33 between work stations 23, 25, 27, 29, as discussed in greater detail hereinafter.

Pallet 39 is provided with a generally rectangular base 41 having marginal edges 43 with an upper face 45 interposed therebetween. A generally cylindric post 47 is secured to base 41 generally centrally thereof and extends generally vertically from upper face 45 of the base. A mounting arbor 49 for stator assembly 37 is adjustably pivotally or rotatably mounted on base 41 about post 47, and the mounting arbor is secured by suitable means, such as for instance welding or the like (not shown) to a manually adjustable lever 51 pivotally or rotatably slidable on upper face 45 of the base between a plurality of preselected rotated or pivoted positions defined by a plurality of holes 53 provided in the base. A lock pin 55 carried on lever 53 is removably received in a respective one of holes 53 to maintain mounting arbor 49 and lever 53 in one of the preselected rotated positions therefor. Mounting arbor 49 is provided with a generally annular or circumferential seating surface 57, and at least a pair of generally opposite keys 59, 59a are mounted on the arbor extending generally vertically from the seating surface. To complete the description of pallet 39, a set of lead holders 61, 61a, 61b are fastened in preselected locations to upper face 45 of base 41 adjacent one of the marginal edges 43 thereof.

Stator assembly 37 includes a core 63 of ferromagnetic material having a plurality of generally radially inwardly extending teeth 65 defining in part a bore 67 which extends generally axially through the core intersecting a pair of generally opposite end faces 69, 69a thereof, respectively. A winding or winding means 71 is disposed or arranged on core 63 extending in part between core teeth 65 and forming a pair of opposite generally annular groupings of winding end turns 73, 73a spaced adjacent opposite end faces 69, 69a of the core, respectively. A set of winding leads 75, 75a, 75b extend generally from the same preselected area or location on end turn grouping 73 of winding 71 with each lead having a free end 77, and the leads are at least in part encased in a set of generally elongate dielectric material tubes 79, 79a, 79b each having a pair of opposite end portions 81, 83 with the free ends 77 of the leads extending beyond the free opposite end portions 81 of the tubes. As is well known in the art and as best seen in FIG. 2, opposite end portion 83 of tubes 79, 79a, 79b are illustrated as being anchored or received in displacement preventing engagement between some of the end turns of end turn grouping 73; however, it is contemplated that opposite end portions 83 of the tubes may be spaced adjacent or abutted against the end turn grouping within the scope of the invention so as to meet at least some of the objects thereof. Tubes 79, 79a, 79b may be formed from a suitable dielectric material compatible with a hermetic environment and having the desired physical and insulating properties, such as for instance a Mylar material or the like, available from E. I. DuPont De Nemours & Company, Wilmington, Del.; however it is contemplated that other tubes formed of different materials may be utilized within the scope of the invention so as to meet at least some of the objects thereof. Further, leads 75, 75a, 75b are integral with winding 71, and the windings and leads are formed of magnet wire having a conductor with a coating of a dielectric material adhered thereon which may also be compatible with a hermetic environment, as well known in the art. It should be noted that leads 75, 75a, 75b and tubes 79, 79a, 79b are initially provided with lengths which are greater than preselected lengths therefor with said lengths being measured between end turn grouping 73 of winding 71 and the opposite end portion 81 of the tubes and the free ends 77 of the leads, respectively.

When stator assembly 37 is loaded onto pallet 39 at loading work station 23 by the operator, bore 67 of the stator assembly is received in locating or aligning relation or engagement about mounting arbor 49 with opposite keys 59, 59a thereof extending in aligning or guiding relation between adjacent ones of teeth 65 on stator core 63, respectively, and opposite end face 69 of the stator core is seated in engagement on annular seating surface 57 of the mounting arbor. Thus, with stator assembly 37 so located in its preselected assembly position on mounting arbor 49 of pallet 39, as discussed above, opposite end turn grouping 73 of winding 71 is spaced adjacent upper face 45 of pallet base 41, and tubes 79, 79a, 79b with leads 75, 75a, 75b extending therethrough are predeterminately positioned for assembly engagement with holders 61, 61a, 61b on pallet 39. As previously mentioned, mounting arbor 49 and lever 51 are pivotally movable between preselected pivoted positions on pallet 39 to accommodate different lengths of leads 75, 75a, 75b which may be required on stator assembly 37.

At this time, the operator manually extends leads 75, 75a, 75b and tubes 79, 79a, 79b from end turn grouping 73 of winding 71 and disposes the tubes in releasable holding or securing engagement with holders 61, 61a, 61b on pallet 39 thereby to arrange both the leads and the tubes in preselected positions therefor on the pallet. When so disposed in their preselected positions, it may be noted that free opposite end portions 81 of tubes 79, 79a, 79b predeterminately extend beyond marginal edge 43 of pallet base 41 and the free ends 77 of leads 75, 75a, 75b extend still farther beyond the free opposite end portions of the tubes, respectively.

When stator assembly 37 is loaded onto pallet 39 at loading work station 23, as discussed hereinabove, the loaded pallet (shown in dotted outline in FIG. 1) may be manually moved by an operator across conveyor means 33 on cabinet top 35 to cutting work station 25, and adjacent marginal edges 43 on the pallet may be engaged with pallet locating device 31 at the cutting work station thereby to locate the pallet and the stator assembly thereon in a predetermined position with respect to the cutting work station.

Figure 4:
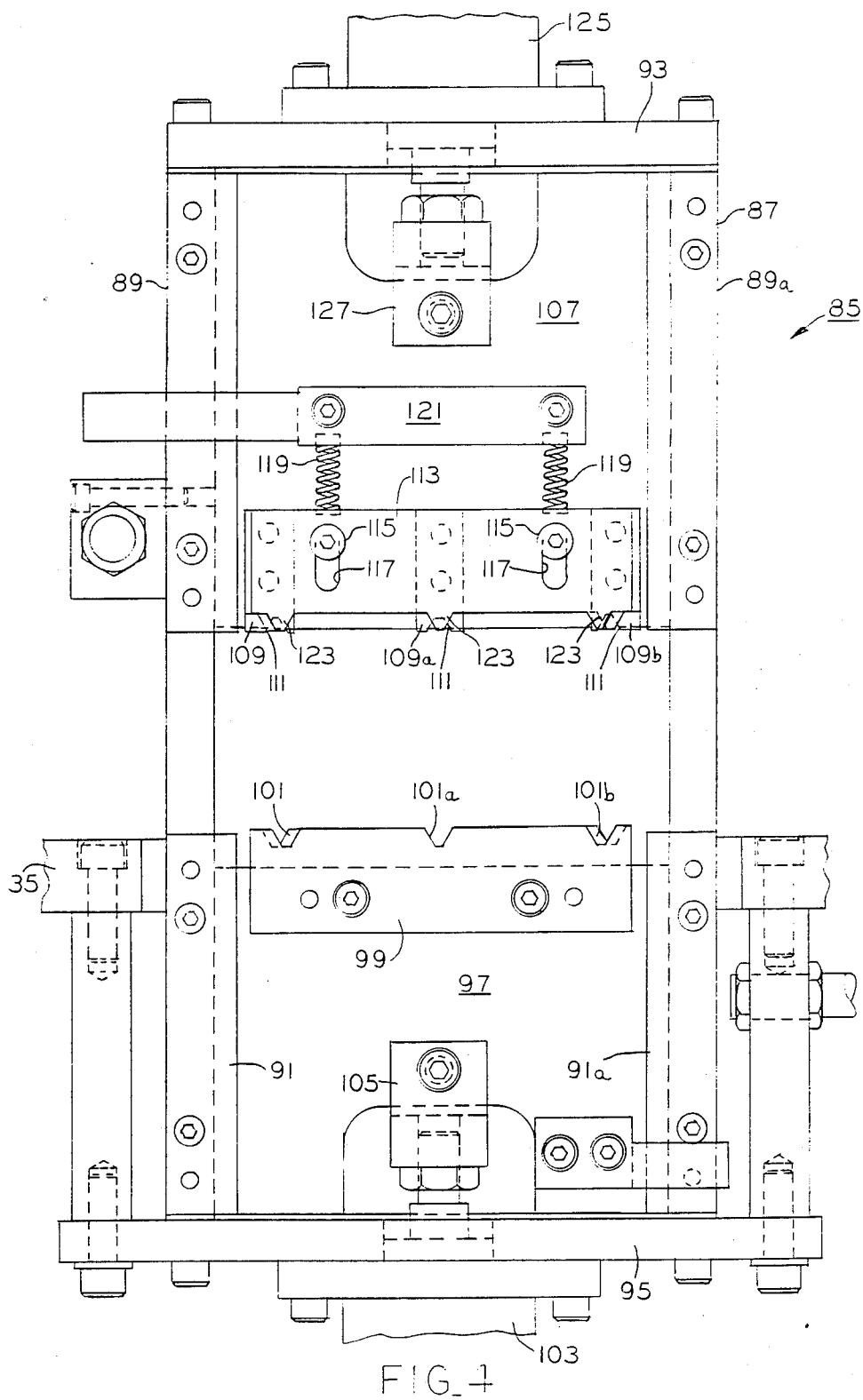
FIG. 4 is a front elevational view of a lead cutting device disposed at the lead cutting work station shown in FIG. 1.
Figure 6:
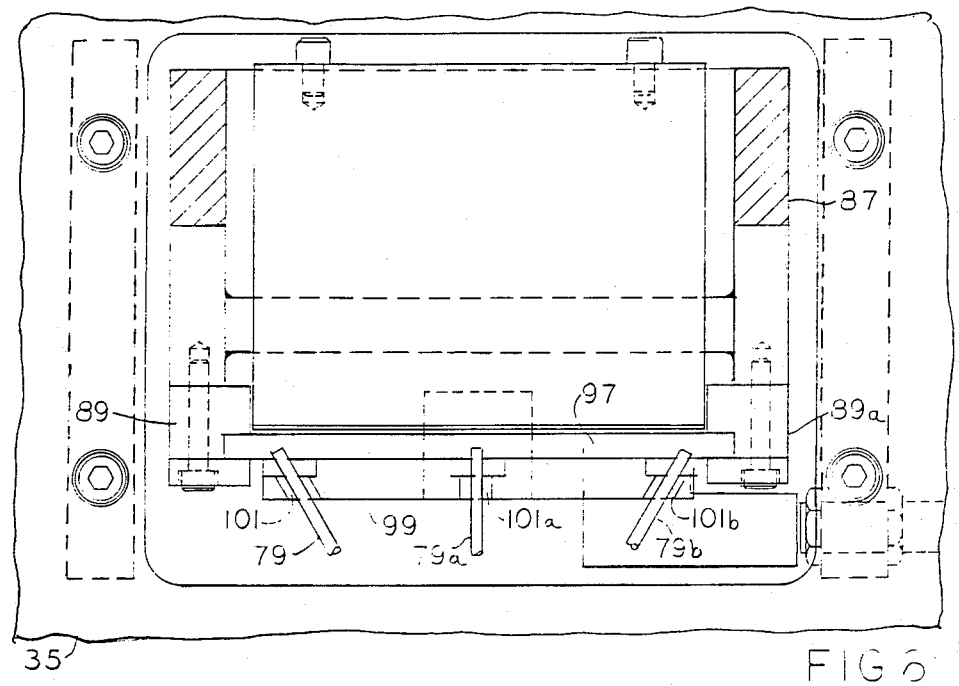
FIG. 6 is a sectional view taken along line 6—6 in FIG. 4 but showing a cut off die actuated into supporting relation with the leads of the stator assembly disposed in a preselected position with respect to the cut off die.

A lead cutting or trimming means or device 85 is provided with a supporting frame 87 mounted to cabinet top 35 at cutting work station 25, as best seen in FIG. 4. Supporting frame 87 includes upper and lower pairs of opposed guides or guide rails 89, 89a and 91, 91a which are respectively arranged adjacent upper and lower plates 93, 95 on the supporting frame. A lower slide 97 is reciprocally movable or slidable in lower opposed guides 91, 91a between a retracted or at-rest position, as shown as best seen in FIG. 6. A cut off die 99 is secured to slide 97 adjacent its upper end, and lead receiving grooves or notches 101, 101a, 101b are provided in the cut off die. Lower plate 95 supports a fluid motor 103 of a type well known to the art, such as for instance a double-acting air motor or the like, and the fluid motor is drivingly interconnected with slide 97 by a push rod and clevis assembly 105. Thus, when pallet 39 is in its predetermined located position at cutting work station 25, as previously discussed, fluid motor 103 may be actuated to drive slide 97 from its retracted position to the protracted position thereof, and when slide 97 is in its protracted position, grooves 101, 101a, 101b in cut off die 99 are disposed to receive free ends 77 of leads 75, 75a, 75b, as best seen in FIG. 6.

Figure 5:
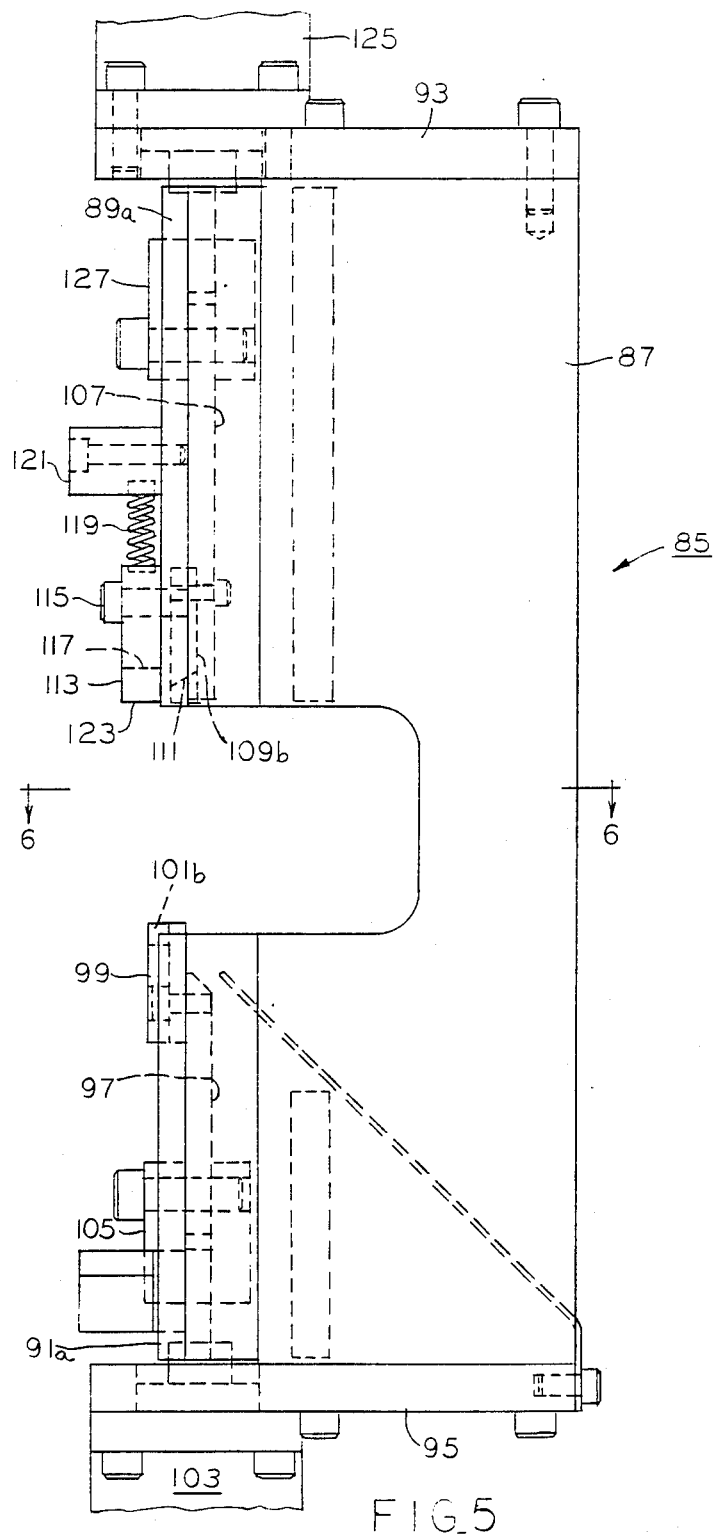
FIG. 5 is a side elevational view of the lead cutting device of FIG. 4.

An upper slide 107 is reciprocally movable or slidable in upper opposed guides 89, 89a between a retracted or at-rest position, as shown in FIGS. 4 and 5, and a protracted or lead cutting position, as discussed hereinafter. A set of cut off blades 109, 109a, 109b each having a lead cutting groove or notch 111 therein are secured to slide 107 adjacent its lower end, and cutting groves 111 in the cut off blades are disposed generally in vertical and off-set alignment with grooves 101, 101a, 101b of cut off die 99. A stripper or stripper plate 113 is arranged in overlaying relation with slide 97, and the stripper is retained against displacement from slide 97 by a set of shoulder screws 115 interposed therebetween and slidably received in a set of elongate guide slots 117 provided in the stripper. A set of springs 119 are interposed between stripper 113 and a block 121 secured to slide 97, and the compressive force of the springs urge end portions of elongate guide slots 117 into abutting engagement with shoulder screws 115 thereby to position a set of projections 123 on the stripper plate in overlaying relation with cutting grooves 111 in cut off blades 109, 109a, 109b, respectively, as best seen in FIG. 4.

Upper plate 93 supports a fluid motor 125 of a type well known to the art, such as for instance a double-acting air motor or the like, and the fluid motor is drivingly interconnected by a push rod and clevis assembly 127 to upper slide 107. Thus, when leads 75, 75a, 75b in their preselected located positions are supported and received in grooves 101, 101a, 101b of cut off die 99, as previously described, fluid motor 123 may be actuated to drive slide 107 downwardly in upper guide rails 89, 89a thereby to move the slide from the retracted position toward the protracted position thereof. During this downward or protractile movement of slide 107, projections 123 on stripper 113 respectively engage free ends 77 of leads 75, 75a, 75b supported in grooves 101, 101a, 101b of cut off die 99 thereby to retain the leads against displacement from their preselected position in the grooves. In response to further protractile movement of slide 107 relative to stripper 113 when projections 123 are engaged with leads 75, 75a, 75b, as discussed above, cutting grooves 111 in cut off blades 109, 109a, 109b engage the leads thereby cutting or trimming a distal section or part from the free ends 77 of the leads which, of course, trims the leads to the preselected lengths thereof, respectively. Subsequent to the trimming of leads 75, 75a, 75b, as discussed above, air motors 103, 125 may be further actuated or deactuated to return lower and upper slides 97, 107 to the retracted or at-rest positions thereof, respectively.

When leads 75, 75a, 75b of stator assembly 37 have been trimmed or cut to the preselected lengths thereof at cutting work station 25, as discussed hereinabove, pallet 39 (shown in dotted outline in FIG. 1) with the stator assembly loaded thereon may be manually transferred by the operator across conveyor means 33 on cabinet top 35 to tube severing work station 27, and adjacent marginal edges 43 on the pallet may be engaged with pallet locating device 31 at the tube severing work station thereby to locate the pallet and the stator assembly thereon in a predetermined position with respect to the tube severing work station.

Figure 9:
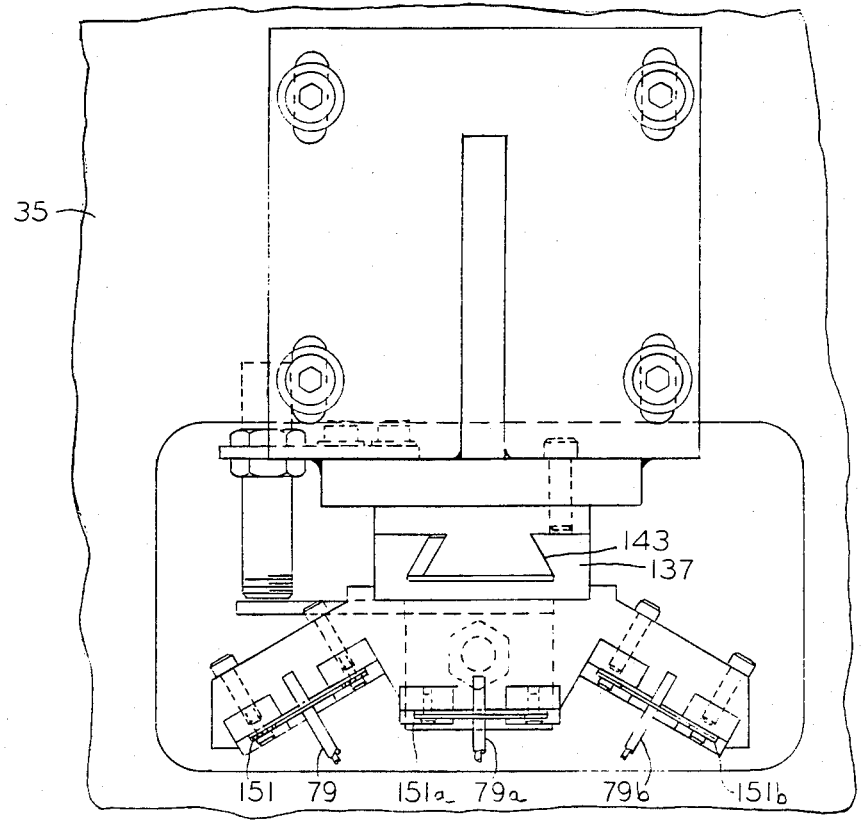
FIG. 9 is a sectional view taken along line 9—9 in FIG. 7 showing the tubes about the leads of the stator assembly disposed in a preselected position with respect to a lower heated blade of the tube severing device.
Figure 7:
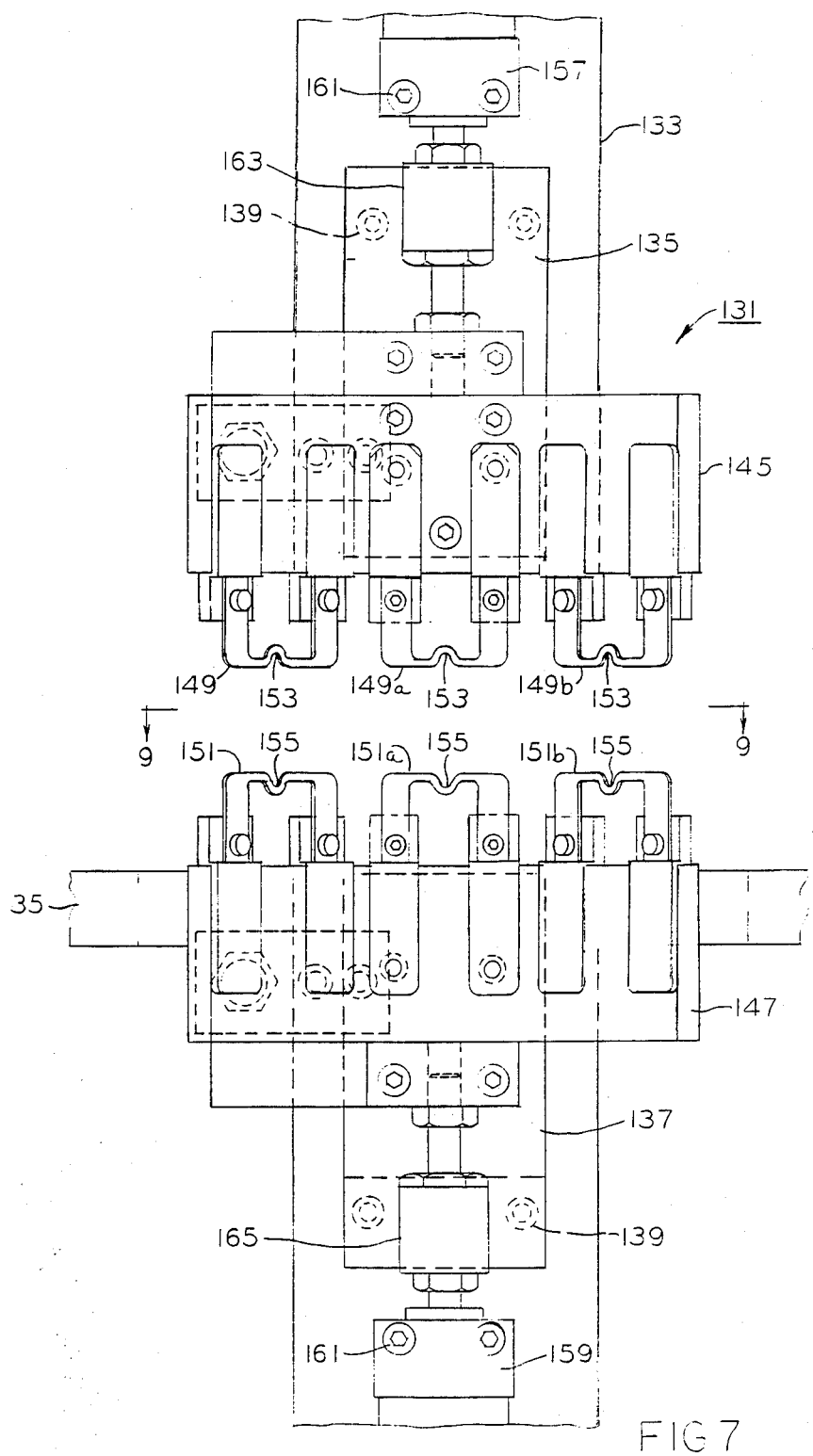
FIG. 7 is a front elevational view of a tube severing device disposed at the tube severing work station shown in FIG. 1.
Figure 8:
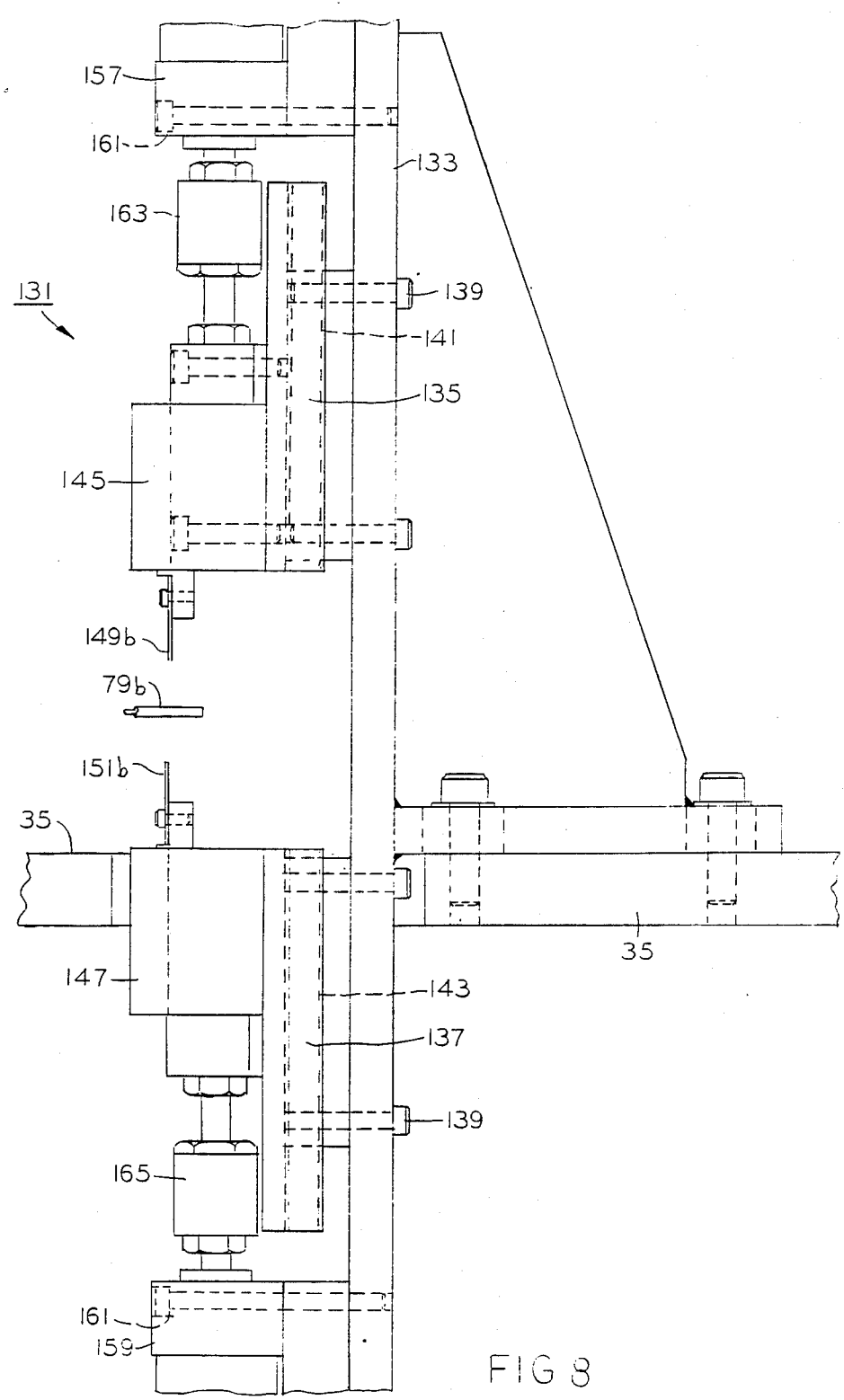
FIG. 8 is a side elevational view of the tube severing device of FIG. 7.

A tube severing means or device 131 is provided with a supporting frame 133 mounted to cabinet top 35 by suitable means, such as a plurality of mounting bolts or the like for instance, at tube severing work station 27, as best seen in FIG. 7. Supporting frame 133 includes upper and lower guides 135, 137 secured in spaced apart aligned relation to the supporting frame by suitable means, such as for instance a plurality of bolts 139 or the like. Upper and lower guides 135, 137 respectively define a pair of vertically aligned grooves or groove means 141, 143 having a generally dove tail shape, and a pair of upper and lower slides 145, 147 are received in guiding and sliding relation in the grooves of the guides. Slides 145, 147 are reciprocally movable or slidable in guide grooves 141, 143 between a retracted or at-rest position, as shown in FIGS. 7-9, and a protracted position, as discussed in greater detail hereinafter.

A set of tube severing means, such as for instance electrically heated blades 149, 149a, 149b and 151, 151a, 151b or the like, are respectively carried on upper and lower slides 145, 147 so as to be conjointly movable therewith, and the heated blades are arranged generally in vertical alignment with each other, and tubes 79, 79a, 79b on leads 75, 75a, 75b of stator assembly 37 are disposed between the blades when pallet 39 is located in its predetermined position at tube severing work station 27, as previously discussed. While blades 149, 149a, 149b and 151, 151a, 151b are disclosed herein as being electrically heated, the apparatus and connections for effecting the electrical heating of the blades is omitted for the purpose of brevity of disclosure and drawing simplification. As best seen in FIGS. 7, 10, and 11, each of heated blades 149, 149a, 149b is provided with a lead receiving recess 153 which is generally vertically aligned with another lead receiving recess 155 provided in each of heated blades 151, 151a, 151b. To complete the description of tubes severing device 131, a pair of fluid motors 157, 159, such as for instance double-acting air motors or the like, are mounted to supporting frame 133 by suitable means, such as for instance a plurality of bolts 161 or the like, and the air motors are drivingly interconnected with slides 145, 147 by a pair of push rod and self-aligning coupler assemblies 163, 165, respectively. Thus, when pallet 39 is in its predetermined located position at tube severing work station 27, as previously discussed, fluid motors 157, 159 may be generally simultaneously actuated to drive slides 145, 147 from the retracted positions to the protracted positions thereof, and heated blades 149, 149a, 149b and 151, 151a, 151b are conjointly moved with the slides into the tube severing positions of the heated blades engaging tubes 79, 79a, 79b on leads 75, 75, 75b of stator assembly 37 on pallet 39, as best seen in FIGS. 10 and 11. In the tube severing positions of blades 149, 149a, 149b and 151, 151a, 151b, it may be noted that the free or tip ends of the opposed blades are closely adjacent each other but not engaged. While all of heated blades 149, 149a, 149b and 151, 151a, 151b are moved into their tube severing positions with respect to tubes 79, 79a, 79b, only one set of heated blades are shown in FIGS. 10 and 11 for the sake of drawing simplification.

When heated blades 149, 149a, 149b and 151, 151a, 151b are moved into their tube severing positions, as previously mentioned, the engagements of the heated blades with tubes 79, 79a, 79b melt or burn a circumferential opening 167 through the tubes to sever a distal section 171 from opposite end portion 81 of each tube. Furthermore, when heated blades 149, 149a, 149b and 151, 151a, 151b are moved into their tube severing positions, the trimmed free ends 77 of leads 75, 75a, 75b are received in spaced apart relation within opposed recesses 153, 155 of the heated blades thereby to obviate heating or melting through of the dielectric coating on the leads so as to preserve the insulating integrity thereof. Thus, it may be noted that upon the severance of distal sections 171 on tubes 79 79a, 79b, as previously discussed, the insulating integrity of the dielectric coating on leads 75, 75a, 75b is uninterrupted by the accommodation of the leads within opposed recesses 153, 155 of heated blades 149, 149a, 149b and 151, 151a, 151b so as to not sever such insulated coating and thereby maintain the insulating integrity thereof. Furthermore, it may also be noted that no residue of the dielectric material of tubes 79, 79a, 79b is transferred onto leads 75, 75a, 75b upon the severance of distal sections 171 from the tubes.

Upon the trimming or severance of distal sections 171 from free opposite end portions 81 of tubes 79, 79a, 79b, as described above, fluid motors 157, 159 may be reactuated or deactuated to effect the retractile movement of upper and lower slides 145, 147 in grooves 141, 143 of upper and lower guides 135, 137 from the protracted positions of the slides to the retracted positions thereof, respectively. Thereafter, pallet 39 with stationary assembly loaded thereon may be manually moved by the operator across conveyor means 33 on cabinet top 35 into a position displaced from tube severing work station 27, and the operator may manually remove the distal end sections 171 by sliding or passing them from the trimmed free ends 77 of leads 75, 75a, 75b, respectively as best seen in FIG. 14. Thus, upon the removal of distal sections 171 from tubes 79, 79a, 79b, it may be noted that such tubes are also trimmed to a preselected length measured between opposite end portions 83 of the tubes and the trimmed free opposite end portions 81 thereof, and the preselected length of the tubes is predeterminately less than the preselected lengths of leads 75, 75a, 75b.

Subsequent to the removal of distal sections 171 from tubes 79, 79a, 79b, as discussed above, pallet 39 with stator assembly 37 loaded thereon may be manually moved to terminating work station 29 where a set of terminals or terminal means 173 may be gripped into electrical contacting engagement with the trimmed free ends 77 of leads 75, 75a, 75b at least adjacent the trimmed free opposite end portions 81 of tubes 79, 79a, 79b, respectively, as shown in FIG. 15. Terminals 173 penetrate the dielectric coating on leads 75, 75a, 75bso as to respectively engage in electrical conductive relation the conductor of such leads. It is contemplated that various different types of terminating equipment well known to the art may be employed at terminating work station 27 to conductively attach terminals 173 to leads 75, 75a, 75b either generally simultaneously or individually within the scope of the invention so as to meet at least some of the objects thereof; however, for the sake of brevity of disclosure and drawing simplification, a description of such terminating equipment is omitted.

From the foregoing, it is now apparent that a novel terminating method has been presented meeting the objects set out hereinbefore, as well as others, and that changes as to the precise arrangements, shapes, details and connections of the component parts utilized in the practice of such method, as well as the precise order of the method steps, may be made by those skilled in the art without departing from the spirit of the invention or the scope thereof as set out by the claims which follow.

What we claim as new and desire to secure by Letters Patent of the United States is:

1. A method of terminating a set of leads integral with a winding on a dynamoelectric machine stator assembly, the winding and the leads being formed of a conductor having a dielectric material coating adhered in insulating relation thereon and each lead extending from a part of the winding and having a free end, a set of dielectric material tubes respectively arranged about the leads and with the tubes each having a portion anchored in a part of the winding and a free end portion spaced adjacent the free end of a respective one of the leads, a set of terminal means for the leads, pallet means for the stator assembly, a plurality of work stations, cutting means for operation at one of the work stations, and a severing device for operation at another of the work stations including a plurality of sets of opposed heated blades, and a pair of opposed recesses in each set of opposed heated blades, respectively, the method comprising the steps of:

loading the stator assembly in a preselected position on the pallet means at a loading work station;

locating the tubes in preselected positions on respective parts of the pallet means when the stator assembly is in its preselected position;

extending the free end portions of the tubes and the free ends of the leads beyond the pallet means, respectively, in response to the locating step;

transferring the pallet means from the loading work station into a predetermined located position at the one work station;

positioning the free ends of the leads in preselected positions with respect to the cutting means when the pallet means is in its predetermined located position at the one work station;

effecting the operation of the cutting means at the one work station;

trimming from each lead a distal part adjacent the free end of each lead thereby to provide each lead with a preselected length between the winding part and the trimmed free end of each lead in response to the effecting step;

moving the pallet means from the one work station into another predetermined located position at the another work station;

placing the tubes in preselected positions generally between the opposed heated blades of the severing device, respectively, when the pallet means is in its another predetermined located position;

actuating the opposed heated blades generally toward each other, respectively;

engaging the opposed heated blades with the tubes, respectively, in response to the actuating step and completely severing from each tube a distal section adjacent the free end portion of each tube in response to the engaging step thereby to define a preselected length of the tubes between the anchored ends and the free end portions thereof from which the distal sections were severed, respectively;

receiving the leads within the opposed recesses of the opposed heated blades in spaced apart relation from the opposed heated blades during the severing step thereby to obviate severance of the dielectric material coating on the leads by the opposed heated blades and maintain the insulating integrity of the dielectric material coating, respectively;

removing the pallet means at least in part from the another work station;

sliding the severed distal sections of the tubes from the leads, respectively;

moving the pallet means to a termination station; and interconnecting the terminal means in electrical conductive relation with the leads at least generally adjacent the trimmed free ends thereof, respectively.

2. A method of terminating a set of leads integral with a winding on a stator assembly for a dynamoelectric machine, the winding and the leads being formed of a conductor having a dielectric material coating adhered in insulating relation thereon and each lead extending from a part of the winding and having a free end, a set of dielectric material tubes respectively arranged about the leads and with the tubes each having a portion anchored in a part of the winding and a free end portion spaced adjacent the free end of a respective one of the leads, a set of terminal means for the leads, pallet means for the stator assembly, a plurality of work stations, cutting means for operation at one of the work stations, a severing device for operation at another of the work stations including a plurality of sets of opposed heated blades, and a pair of opposed recesses in each set of the opposed heated blades, respectively, the method comprising the steps of:

loading the stator in a preselected position on the pallet means at a loading work station and locating the tubes in preselected positions with respect to a marginal part of the pallet means so that the free end portions of the tubes and the free ends of the leads extend beyond the marginal part, respectively;

transferring the pallet means from the loading work station to the one work station and predeterminately locating the free ends of the leads with respect to the cutting means at the one work station;

effecting the operation of the cutting means and trimming from each lead a distal part adjacent the free end of each lead thereby to provide each lead with a preselected length between the winding part and the trimmed free end of each lead;

transferring the pallet means from the one work station to the another work station and placing the tubes in predetermined positions between the opposed heated blades of the severing device, respectively;

effecting the operation of the severing device at the another work station and moving the opposed heated blades in directions generally toward each other, respectively;

engaging the opposed heated blades with the tubes so as to effect the severance of a distal section of each tube adjacent its free end portion in response to the operation of the severing device and receiving the leads within the recesses in the opposed heated blades during the engaging step without interrupting the insulating integrity of the dielectric coating on the leads, respectively;

displacing the pallet means at least in part with respect to the another work station and removing the severed distal sections from the leads, respectively; and moving the pallet means to a termination station and interconnecting the terminal means in electrical conductive relation with the leads at least generally adjacent the trimmed free ends thereof; respectively.

3. A method of terminating a set of leads integral with a winding on a dynamoelectric machine stator assembly and extending from a part of the winding, the winding and the leads being formed of a magnet wire having a conductor with a dielectric material adhered in insulating relation thereto and each lead having a free end, a set of dielectric material tubes respectively extending about the leads with each tube having a pair of opposite end portions, one of said opposite end portions being disposed at least adjacent the winding part and the other of said opposite end portions being spaded adjacent the free ends of a respective one of the leads, pallet means for the stator assembly, a plurality of work stations, and a severing device for operation at one of the work stations, the method comprising the steps of:

loading the stator assembly o the pallet means at a loading work station and arranging the tubes in preselected positions with respect to a part of the pallet means so that at least the other opposite end portions of the tubes are disposed beyond the pallet means part with the free ends of the leads extending beyond the other opposite end portions, respectively;

moving the pallet means to the one work station and associating the other opposite end portions in preselected located positions with respect to the severing device, respectively;

operating the severing device to effect a complete severance of a distal section of each tube adjacent the other opposite end portion thereof without interrupting the insulating integrity of the dielectric coating on the leads; and displacing the pallet means at least in part with respect to the one work station and then removing the severed distal sections from the leads, respectively.

4. The method as set forth in claim 3 wherein another of the work stations includes a means operable generally for cutting the leads and wherein the method further comprises the intermediate step of transferring the pallet means from the loading work station to the another work station and locating the leads in preselected positions with respect to the cutting means.

5. The method as set forth in claim 4 further comprising the further intermediate step of effecting the operation of the cutting means and trimming from each lead a distal part adjacent the free end of each lead thereby to provide each lead with a preselected length defined between the winding part and the trimmed free end of each lead.

6. The method as set forth in claim 5 wherein the stator assembly also has a set of terminal means for the leads and wherein the method further comprises the additional step of transferring the pallet means to a termination work station and interconnecting the terminals in electrical conductive relation with the leads at least generally adjacent the trimmed free ends thereof, respectively.

7. The method as set forth in claim 3 wherein the severing device includes a plurality of sets of opposed heated blades disposed adjacent the tubes in the preselected located positions thereof, respectively, and wherein the operating step includes engaging the opposed heated blades with respective ones of the tubes and melting through the tubes thereby to effect the severance of the distal sections from the tubes, respectively.

8. A method of terminating a set of leads integral with a winding on a stator assembly for use in a dynamoelectric machine, the winding and leads being formed of magnet wire having a conductor with a dielectric material coating disposed in insulating relation thereon and with each lead extending from a part of the winding and having a free end, a set of dielectric material tubes respectively arranged about the leads and including a pair of generally opposite end portions, one of the opposite end portions being disposed at least adjacent the winding part, and the other of the opposite end portions being spaced adjacent the free ends of the leads, respectively, the method comprising the steps of:

arranging the tubes at least in part in preselected positions with respect to each other and with the leads extending through the tubes, respectively;

trimming only the leads adjacent the free ends thereof while maintaining the tubes in their preselected positions and providing each lead with a preselected length between its trimmed free end and the winding part in response to the trimming step;

severing a distal section of each tube adjacent its other opposite end portion and maintaining the insulating integrity of the respective dielectric material coatings on the leads during the severing step; and removing the severed distal sections from the leads, respectively.

9. The method as set forth in claim 8 wherein the removing step includes passing the severed distal sections along the leads beyond the trimmed free ends thereof, respectively.

10. The method as set forth in claim 8 wherein the stator assembly also has a set of terminals and wherein the method further comprises the additional step of interconnecting the terminals in electrical conductive relation with the leads at least generally adjacent the trimmed free ends thereof, respectively.

11. The method as set forth in claim 10 wherein the interconnecting step includes deforming a part of each terminal into the electrical conductive engagement with the conductor in each lead and puncturing the dielectric coating on each lead with the terminal part.

12. The method as set forth in claim 8 wherein the severing step includes melting through each tube to define the severed distal section thereof.

13. A method of terminating a set of leads integral with a winding on a stator assembly for use in a dynamoelectric machine, the winding and the leads being formed of magnet wire having a conductor with a dielectric material coating thereon and with each lead extending from a part of the winding and having a free end, and a set of dielectric material tubes respectively extending about the leads, the tubes including a pair of generally opposite end portions, the method comprising the steps of:

arranging at least one of the opposite end portions of the tubes in preselected positions with respect to each other with the free ends of the leads extending beyond the one opposite end portions, respectively;

melting through each tube and severing a distal section from each tube adjacent its one opposite end portion in response to the melting step;

maintaining the insulating integrity of the dielectric material coating on the leads during the melting step; and removing the severed distal sections of the tubes from the leads, respectively.

14. The method as set forth in claim 13 further comprising the intermediate step of trimming the leads adjacent their free ends and providing each lead with a preselected length between the winding part and the trimmed free end.

15. The method as set forth in claim 14 wherein the stator assembly includes a set of terminals and wherein the method further comprises the additional step of connecting the terminals to the leads at least generally adjacent their trimmed free ends with the terminals each having a part puncturing the dielectric material coating so as to be engaged in electrical conductive relation with the conductor of each lead, respectively.

16. The method as set forth in claim 14 wherein the removing step includes sliding the severed distal sections of the tubes from the leads past the trimmed free ends thereof, respectively.

* * * * *